United States Patent
McBride et al.

(10) Patent No.: US 10,642,703 B2
(45) Date of Patent: May 5, 2020

(54) CONFIGURING A SECONDARY STORAGE SYSTEM FOR DATA MIRRORING

(71) Applicant: International Business Machines Corporation, Armonk, NY (US)

(72) Inventors: Gregory E. McBride, Vail, AZ (US); Dash Miller, St. Louis Park, MN (US); Miguel Perez, Miami, FL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/827,113

(22) Filed: Nov. 30, 2017

(65) Prior Publication Data
US 2019/0163590 A1  May 30, 2019

(51) Int. Cl.
*G06F 11/20* (2006.01)

(52) U.S. Cl.
CPC ...... *G06F 11/2069* (2013.01); *G06F 11/2064* (2013.01); *G06F 11/2066* (2013.01)

(58) Field of Classification Search
CPC .................................. G06F 11/2064–2069
USPC .............................. 711/114; 714/6.23
See application file for complete search history.

(56) References Cited

U.S. PATENT DOCUMENTS

| | | | |
|---|---|---|---|
| 6,633,955 B1 * | 10/2003 | Yin | G06F 11/2069 710/18 |
| 7,464,239 B2 * | 12/2008 | Hwang | G06F 11/2058 709/203 |
| 7,562,250 B2 | 7/2009 | Wahl et al. | |
| 8,060,478 B2 | 11/2011 | Emaru et al. | |
| 2006/0041823 A1 | 2/2006 | Wolfgang | |
| 2014/0108749 A1 | 4/2014 | Sato et al. | |
| 2015/0019507 A1 | 1/2015 | Aronovich | |
| 2015/0277762 A1 | 10/2015 | Guo | |
| 2016/0246511 A1 * | 8/2016 | Miller | G06F 3/0607 |

* cited by examiner

*Primary Examiner* — Joseph R Kudirka
(74) *Attorney, Agent, or Firm* — Daniel R. Simek

(57) ABSTRACT

A method for configuring a storage system. The method includes a computer processor receiving at a storage system, an indication to initiate data mirroring for an application. The method further includes determining a set of information associated with a network-accessible computing system that hosts the application. The method further includes identifying an analysis of historic performance data associated with data mirroring to the storage system with respect to the application. The method further includes identifying a set configuration information associated with data mirroring from among a plurality of sets of configuration information associated with data mirroring based, at least in part, on the determined set of information associated with the network-accessible computing system and the identified analysis of performance data associated with data mirroring with respect to the application. The method further includes applying the identified set configuration information associated with data mirroring for the application to the storage system.

20 Claims, 5 Drawing Sheets

CONFIGURING A SECONDARY STORAGE SYSTEM FOR DATA MIRRORING

BACKGROUND OF THE INVENTION

The present invention relates generally to the field of data storage hardware and software, and more particularly to configuring a secondary storage system for data mirroring.

Disaster recovery systems typically address two types of failures, a sudden catastrophic failure at a single point in time or data loss over a period of time. In the second type of gradual disaster, updates to volumes may be lost. To assist in recovery of data updates, a copy of data may be available from a remote location. Such dual copies are typically made as the application system is writing new data to storage within a primary computing system. Data mirroring is one copy technology for maintaining remote copies of data at a secondary site or in a secondary storage system. In data mirroring systems, data is maintained in storage volume (e.g., disk) pairs. A volume pair is comprised of a storage volume within a primary computing system and a corresponding volume in a secondary storage system that includes an identical copy of the data maintained in the primary volume. Primary and secondary control units, also known as storage controllers or enterprise storage servers, may be utilized to enable more direct control of communications and transfers of data between the primary and secondary storage devices.

Data mirroring differs from data backup. Data backup saves a copy of data that is unchanged for a long period of time. Data mirroring occurs frequently and can be constrained to write activity, such as new data or updated data. In addition, mirroring does not require copying an entire data set or file, just the portions of data that are created or updated are written to storage. Data may be stored as discrete entities, such as tracks, extents, blocks, etc. Therefore, the current version of the data on a secondary storage system is relatively recent. Data mirroring can occur asynchronously to minimize write delays within a storage system of the primary computing system. As such, asynchronous data mirroring can achieve a relatively small recovery point objective (RPO) value. A RPO value is a maximum, targeted, period of time, as defined by a user (i.e., client), during which data mirrored to a secondary storage system is out-of-sync with the data stored within the primary computing system.

SUMMARY

According to aspects of the present invention, there is a method, computer program product, and/or system for configuring a storage system. In an embodiment, the method includes at least one computer processor receiving at a storage system, an indication to initiate data mirroring for an application. The method further includes determining a set of information associated with a network-accessible computing system that hosts the application. The method further includes identifying an analysis of historic performance data associated with data mirroring to the storage system with respect to the application. The method further includes identifying a set configuration information associated with data mirroring from among a plurality of sets of configuration information associated with data mirroring based, at least in part, on the determined set of information associated with the network-accessible computing system and the identified analysis of performance data associated with data mirroring with respect to the application. The method further includes applying the identified set configuration information associated with data mirroring for the application to the storage system.

DETAILED DESCRIPTION

Figure 1:
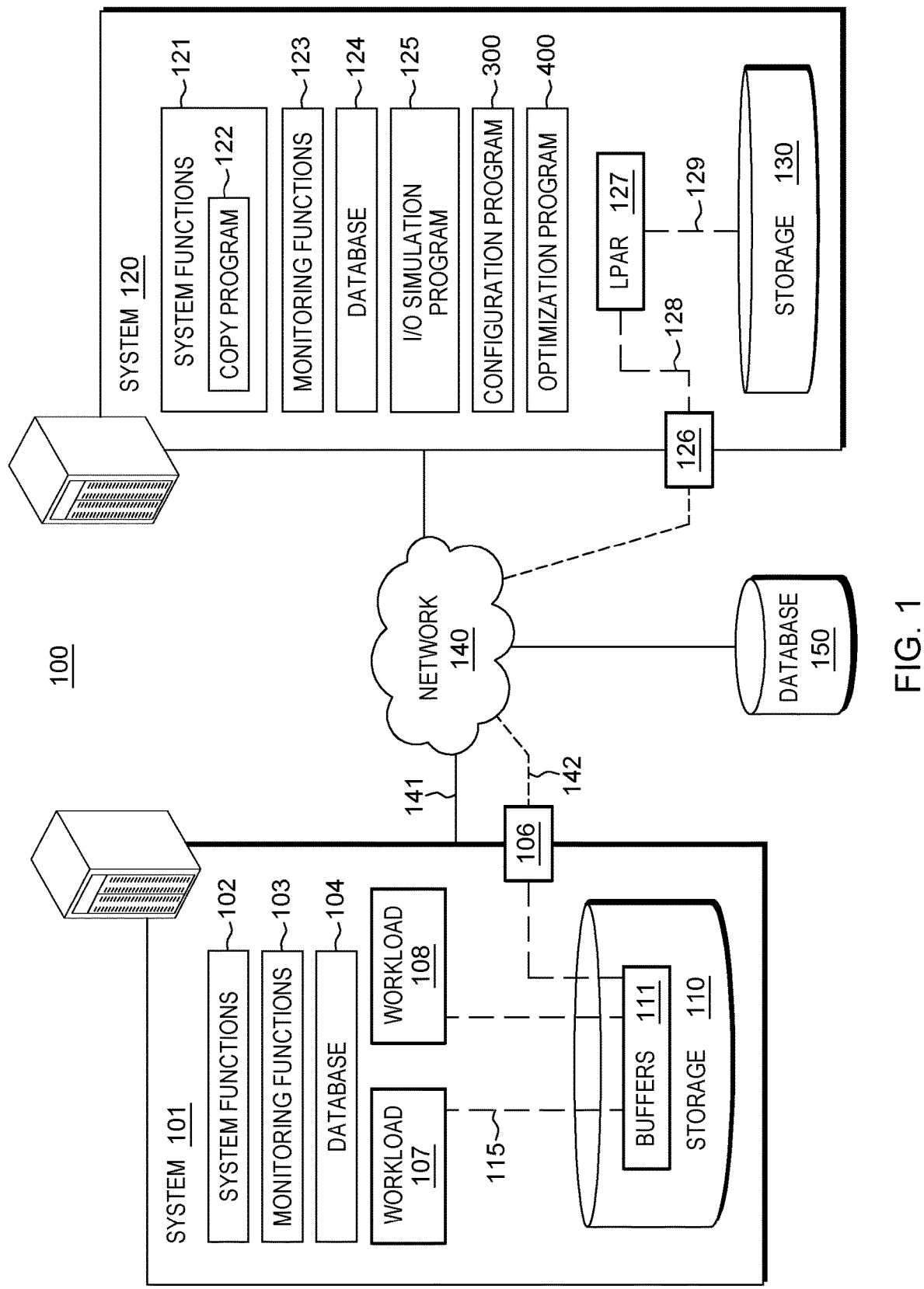
FIG. 1 illustrates a networked computing environment, in accordance with an embodiment of the present invention.

Embodiments of the present invention recognize that protecting data, by utilizing data mirroring between a primary computing system and one or more secondary storage systems, can occur within the same IT infrastructure (e.g., a company). Alternatively, or in addition to, data mirroring can occur between different IT infrastructures where data mirroring to a secondary storage system is a service purchased by clients of the primary computing system. As such, changes to the infrastructure of the primary computing system can negatively affect the performance of the data mirroring associated with the secondary storage system, herein after referred to as the storage system. In addition, the bandwidth and amount of traffic related to various aspects of a network utilized to transfer data from a primary computing system to a storage system also affects data mirroring. In response to determining that the performance of the storage system is negatively affected, an administrator of the storage system obtains information related to the primary computing system and/or the network to manually update a set of configuration information related to the portion of the storage system associated with data mirroring for a client. In addition, embodiments of the present invention recognize that a client can provision multiple logical partitions (LPARs) within the storage system associated with data mirroring, and each LPAR can include multiple tasks performing data mirroring.

Embodiments of the present invention also recognize that new clients (e.g., owners of an application) and applications that utilize data mirroring are continually created; and that each client and application may require one or more configurations tailored for mirroring data to a storage system. Embodiments of the present invention recognize that in some instances, a client defines a set of configuration information associated with data mirroring for an application. In other instances, a client utilizes the expertise of an administrator of the storage system to define the set of configuration information associated with data mirroring based on input from the client. In some scenarios, an application within a primary computing system executes continually and in response to a restart of some or all of a storage system, one or more LPARs utilized for data mirroring for the application automatically provision and begin data mirroring tasks. In other scenarios, an application within the primary computing system executes on demand (e.g., as dictated, as scheduled, etc.). In response to the execution of the application, the primary computing system notifies (e.g., sends an indication or message) a storage system to provision a LPAR for data mirroring for the application of the client.

Embodiments of the present invention recognize that the quantities and rates of producing/updating of data for mirroring are variable and as such, static configurations within the storage system are based on various tradeoffs and compromises. Static configurations within the storage system cannot respond changes to the quantities and/or rates of data mirroring not previously identified, and can negatively affect the performance of the data mirroring to the storage system. Embodiments of the present invention recognize that in response to determining that the performance of the storage system is negatively affected by changes to quantities and rates of data mirroring, an administrator of the storage system obtains information related to the quantities and rates of data mirroring to manually update one or more configurations within the storage system that supports data mirroring for a client. Similarly, embodiments of the present invention recognize that static configurations within a storage system cannot respond to changes within a network and/or hardware changes within the primary computing system, especially to changes related to storage subsystems that store the data for the client.

Embodiments of the present invention provide various methods for automating selecting, configuring, and/or updating one or more sets of configuration information of a storage system associated with data mirroring. Administrators (e.g., data mirroring performance and test experts) of a storage system build databases of sets of configuration information associated with data mirroring based on real-world data for utilization by various embodiments of the present invention. In some scenarios, embodiments of the invention are stand-alone features added to the support software of a storage system. In other scenarios, embodiments of the invention are incorporated within data mirroring software of the storage system. In addition to configuring and updating configuration information, embodiments of the present invention add copies of modified sets of configuration information associated with data mirroring to one or more databases, such as a shared database within a cloud storage facility.

Some embodiments of the present invention analyze and model instances of real-world data. The instances of modeled, real-world data may include quantities and rates of write activity (i.e., data mirroring), related hardware and provisioning information for a primary computing system and a storage system; a plurality of data mirroring configurations tuned by a storage system administrator, and/or a plurality of simulation results which can capture situations not yet encountered by administrators of the storage system. For example, modifications to a data mirroring configuration may be caused by changes to: the hardware of the primary computing system, dictates related to data mirroring for a client (e.g., a RPO value change), and/or the quantities/rates of data mirroring to the storage system.

Various embodiments of the present invention can execute concurrently with data mirroring activity to monitor the LPARs utilized for data mirroring and to update one or more configurations of the storage system associated with data mirroring. Other embodiments of the present invention respond to information obtained from one or more sources external to the storage system to determine changes to a configuration. In one example, embodiments of the present invention may identify constraints occurring within the network (e.g., bandwidth limitations, data throttling, and network delays) that communicates data between the primary computing system and the storage system. In another example, embodiments of the present invention may obtain information, such as write pacing delays injected into workloads within the primary computing system that can lead to performance issues with one or more applications of a client and modify a configuration of the storage system.

Further, one skilled in the art would recognize that automating the selection of a configuration associated with data mirroring and periodic reviews of a configuration associated with data mirroring improves the operations of a storage system. In addition, determining configuration associated with data mirroring are further improved by analyzing and creating models associated with real-world data mirroring occurrences that can be included in simulations of various configuration associated with data mirroring. As such, the functioning of such a computing system is seen to be improved in at least these aspects.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked computing environment 100 in an embodiment, in accordance with the present invention. In an embodiment, networked computing environment 100 includes: system 101, system 120, and database 150, all interconnected over network 140. In some embodiments, networked computing environment 100 includes one or more instances of system 120 and/or database 150. Many modifications to the depicted environment may be made by those skilled in the art without departing from the scope of the invention as recited by the claims.

System 101, system 120, and database 150 may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computer systems known in the art. In certain embodiments, system 101, system 120, and database 150 represent computer systems utilizing clustered computers and components (e.g., database server computers, application server computers, etc.) that act as a single pool of seamless resources when accessed through network 140, as is common in data centers and with cloud-computing applications. In general, system 101, system 120, and database 150 are representative of any programmable electronic device or combination of programmable electronic devices capable of executing machine-readable program instructions and communicating with system 101, system 120, and database 150, via network 140. System 101, system 120, and database 150 may include components, as depicted and described in further detail with respect to FIG. 5, in accordance with embodiments of the present invention.

System 101 includes: system functions 102, monitoring functions 103, database 104, network interface 106, workload 107, workload 108, and storage 110. System 101 may also include other network interfaces (not shown) utilized for communications different from data mirroring. System 101 may also include various programs and/or databases, such as, but not limited to: an operating system, a file management program, a database management system, one or more analysis/statistical programs, etc. (not shown) utilized by system 101 and addition to a plurality of executables associated with clients that host applications on system 101. System 101 includes a plurality of internal communication paths represented by instance of communication path 115 (long-dashed line). In an embodiment, system 101 also includes one or more client-side tasks (not shown) that interface with tasks or protocols utilized by copy program 122 of system 120, such as identifying groups record set corresponding to tracks of data that reside in buffers 111 in response to writing the data the tracks among one or more volumes of storage 110.

System functions 102 includes, but is not limited to a hypervisor, a system management facility (SMF), virtualization software, a memory management program, a load balancer, a universal time function, communication programs/protocols, etc. In some embodiments, system functions 102 includes various management functions, such as a function that scan configurations associated an application of a client to determine whether an application utilized data mirroring during the execution of the application. In an example, during the initialization of an application, a task of system functions 102 determines that the initializing application utilizes data mirroring. In response, the task of system functions 102 communicates with system 120 indicating to system 120 to enable data mirroring for the application (e.g., provision and activate LPAR 127). In some instances, system functions 102 may include a storage controller session manager (SCSM).

Monitoring functions 103 includes a suite of monitoring functions that can identify hardware assignments within system 101; monitor input/output (I/O) activity (e.g., amounts of data, rates of data, etc.) by various components or applications, such as write activity associated with workload 107; a polling facility to communicate with network 140 to determine various attributes, such as bandwidth, communication delays, network traffic, etc.

Database 104 includes a plurality of profiles and information related to clients, applications (not shown) of each client, hardware profiles respectively associated with each application, etc. In an embodiment, a profile associated with a client can include information related to: provisioning an application LPARs (not shown) within system 101, instances of storage 110 utilized by an application, storage locations (e.g., a logical unit numbers (LUNs) or volume identifiers (e.g., volsers) for data within storage 110, one or more RPO time values that correspond to various sets of data for mirroring to system 120 (e.g., a storage system), one or more data mirroring schemes corresponding to an application, networking information utilized for data mirroring, etc. In some scenarios, an application may generate different sets of written data having differing levels of criticality, as indicated by corresponding RPO time values. In an example, an application generates workload 107 and workload 108, where workload 107 is comprised of critical data and, workload 108 is comprised of non-critical data. Database 104 may also include messages from a SMF, such as when instances write pacing were applied to a workload; results of various monitoring functions or analyses of monitoring that identifying rates of write activity for an application or workload.

In some embodiments, database 104 includes information related to a plurality of hardware elements of system 101, such as information corresponding to each DASD subsystem (e.g., model number, number of logical/physical devices, storage cache size, etc.), information corresponds to networking subsystems (e.g., number of channels, bandwidth of a channel, communication ports, supported protocols, etc.), computing resources, I/O accelerators, etc.

Network interface 106 is representative of a high-speed network architecture that utilizes communication path 142 of network 140 to communicate with network interface 126 of system 120. Network interface 106 may be representative of physical hardware, virtualized hardware, or a combination thereof. In addition, network interface 106 interfaces with storage 110 and/or buffers 111 via instances of internal communication paths (dashed line) to communicate information (e.g., protocols for data mirroring) and data between system 101 and system 120. In one embodiment, network interface 106 is representative of a network interface card (NIC) and a communication port connected to network 140 by a high-speed, high-reliability connection, such as fiber optic cable. In another embodiment, network interface 106 is representative of a NIC with multiple communication ports connected to network 140 by a set of high-speed, high-reliability connections (e.g., communication path 142). In some embodiments, network interface 106 is representative of a network channel subsystem comprised of a plurality of NICs, communication ports, and high-speed, high-reliability connections.

Workload 107 and workload 108 are representative of data, created or modified, to write to volumes (not shown) of storage 110. In an embodiment, workload 107 and workload 108 represent of a quantity of data, generated by one or more applications of a client, to write to storage 110. Data is written in discrete units based on the architecture of storage volumes, such as tracks on count key data volumes or blocks of fixed-block architecture volumes. Herein units of data are referred to as tracks. Each track of data associated with a workload is written first to buffers 111 prior to writing to a persistent storage element included within storage 110.

Storage 110 is representative of an instance of a direct-access storage device (DASD) subsystem. System 101 may include a plurality of instances of storage 110. Storage 110 may include both volatile storage media (e.g., random access memory) and non-volatile storage media (e.g., persistent storage devices), such as flash memory, hard-disk drives (HDDs), and/or solid-state drives (SSDs). In some embodiments, storage 110 includes multiple of logical storage subsystems (LSS) each comprised of a plurality of logical volumes, physical volumes (i.e., DASD volumes), or a combination thereof. Various volumes within storage 110 form volume pairs with corresponding volumes of storage 130 of system 120 (discussed in further detail with respect to FIG. 2) for data mirroring.

In various embodiments, storage 110 includes buffers 111 and a SCSM (not shown) embedded within the firmware (i.e., microcode) of storage 110. Buffers 111 are representative of storage control cache of a DASD subsystem within storage 110. In another embodiment, control of various aspects of storage 110 is performed by an instance of SCSM of system functions 102. In an alternative embodiment, buffers 111 is based on memory external to storage 110. In addition, storage 110 may include components, as depicted and described in further detail with respect to FIG. 5, in accordance with embodiments of the present invention.

System 120 is a storage system (e.g., backup location) for storing data mirrored from system 101. System 120 is representative of a network-attached storage (NAS) system, a storage area network (SAN), a SAN-NAS hybrid system, a storage system based on a cloud infrastructure, or any storage device or system utilized as a secondary storage location for data mirrored from system 101. In an embodiment, system 120 includes system functions 121, monitoring functions 123, database 124, I/O simulation program 125, network interface 126, LPAR 127, storage 130, configuration program 300, and optimization program 400. System 120 may also include other network interfaces (not shown) utilized for communications different from data mirroring. In addition, system 120 may also include various programs and data (not shown). Examples of programs that system 120 may include are: an operating system, a file management program, a database management system, a suite of analytical, statistical, and modeling programs, a machine learning program, a web interface, etc.

System 120 includes a plurality of internal communication paths (long-dashed line) represented by communication path 128 and communication path 129 that transmit data to and from LPAR 127. In some embodiments, system 120 accesses one or more computing systems (not shown) to provide configuration program 300 and/or optimization program 400 access to capabilities that may not be included within some instances of system 120, such as a suite of analytical, statistical, and modeling programs, and/or a machine learning program.

System functions 121 includes, but is not limited to copy program 122, a hypervisor, a system management facility (SMF), virtualization software, a load balancer, a memory management program, a universal time function, communication programs/protocols, etc. In another embodiment, system functions 121 includes SCSM to control instance of storage 130. Copy program 122 utilizes a set of parameters that affect tasks related to data mirroring. In one embodiment, copy program 122 spawns and controls various tasks utilized for data mirroring, and utilizes protocols/commands to communicate with and pull (i.e., mirror) data from buffers 111 of system 101. In some embodiments, copy program 122 includes performance-monitoring tasks that track data mirroring activity, such as quantities of data (e.g., number of record sets) and rates of data that are mirrored. In other embodiments, copy program 122 utilizes one or more aspects of monitoring functions 123 to performance data associated with the data mirroring activity, such as quantities of data mirrored and rates of data mirroring.

Monitoring functions 123 includes a suite of monitoring functions that can identify hardware assignments within system 120; monitor I/O activity processed by network interface 126; a polling facility to communicate with network 140 to determine various information, such as bandwidth, communication delays, network traffic; a computing resource monitor; etc.

Database 124 includes a plurality of profiles and information related to a client, applications (not shown) of the client, hardware profiles associated with system 101 and system 120 for each client and/or application, network information, sets of configuration information associated with data mirroring, rates of data mirroring activity (e.g., performance data), and monitoring information. In one embodiment, a profile associated with a client can include information, such as client-defined provisioning information for LPAR 127, volume pair identifications (e.g., volume IDs of storage 130 corresponding to volume ID's within storage 110) utilized by an application, one or more RPO time values that corresponds to data of various workload for mirroring to a storage system, data for mirroring by each instance of copy program 122, communication ports utilized for data mirroring, etc. In some embodiments, database 124 periodically uploads new profiles and sets of configuration information associated with data mirroring to shared database 150. In other embodiments, database 124 receives new and/or updated profiles and sets of configuration information associated with data mirroring from shared database 150. In an example, in response to restarting system 120, system 120 updates database 124 with information from database 150.

In another embodiment, a set of configuration information for data mirroring within database 124 includes a set of parameters utilized by an instance of copy program 122 executing within LPAR 127. In an example, parameters utilized by copy program 122 includes a number of executing reader tasks, a number of related reader aliases, a size of a buffer size, a size associated with journal files, a number of journals (e.g., consistency group files), a number of volumes for journal striping, etc. In some scenarios, an application may identify different instances of data written by the application as having differing levels of criticalness, as indicated by corresponding RPO time values. In an example, an application generates workload 107 and workload 108, where workload 107 is comprised of critical data, and workload 108 is comprised of non-critical data. In various embodiments, database 124 also includes messages from a SMF, such as when instances write pacing were applied to a workload within system 101; and results of various monitoring functions (e.g., monitoring functions 123, copy program 122) or analyses of monitoring data mirroring activity. In an example, database 124 includes various models or analyses of instances of actual data mirroring activity that can be utilized to determine a configuration associated with data mirroring for a client, or to input to I/O simulation program 125 to test a modification to a configuration associated with data mirroring.

I/O simulation program 125 simulates data mirroring activity without utilizing actual client or application data. I/O simulation program 125 recreates real-world rates and distributions of data mirroring activity based on statistical models, parametric models, time-variant models, polynomial models, rational functions, or a combination thereof.

Network interface 126 is representative of a high-speed network architecture that utilizes communication path 142 of network 140 to communicate with network interface 106 of system 101. Network interface 126 may be representative of physical hardware, virtualized hardware, or a combination thereof. In addition, network interface 126 interfaces with LPAR 127 via internal communication path 128 (long-dashed line) to communicate information (e.g., protocols for data mirroring) and obtain data and information from system 101 and system 120. Network interface is representative of one or more network interfaces similar to network interfaces previously discussed with respect to network interface 106.

LPAR 127 is representative of a logical partition associated with a client and utilized to mirror data generated by an application (not shown) of the client executing within system 101 to volumes of volume pairs associated with the client within system 120. In an embodiment, LPAR 127 is provisioned within system 120 based on information related to a configuration associated with data mirroring. Provisioning information for LPAR 127 includes, but is not limited to, assigning computer processor resources, I/O accelerators resources, storage, and memory. LPAR 127 may include multiple executing instances of copy program 122 and a plurality of tasks associated with instances of copy program 122, such as reader tasks, memory management, data striping, etc.

Storage 130 is representative of an instance of a direct-access storage device (DASD) subsystem. System 120 may include a plurality of instances of storage 130. Storage 130 may include both volatile storage media (e.g., random access memory) and non-volatile storage media (e.g., persistent storage devices), such as flash memory, hard-disk drives (HDDs), and/or solid-state drives (SSDs). In one embodiment, storage 130 includes multiple of logical storage subsystems (LSS), each comprised of a plurality of logical volumes, physical volumes (i.e., DASD volumes), or a combination thereof. In another embodiment, storage 130 includes a SCSM embedded within the firmware (i.e., microcode) of storage 130. Various volumes within storage 130 are paired (e.g., logically associated) to volumes of storage 110 of system 101 for data mirroring based on volume identifiers, such as volsers. In some embodiments, the volumes of storage 130 is comprised of storage devices with characteristics, such as access times, write speeds equal-to or better-than the paired volumes of storage 110 to minimize impacts to data mirroring. In various embodiment, storage 130 includes one or more other volumes utilized to offload journals (not shown), prepared within LPAR 127 prior to writing the mirrored data (e.g., tracks) to corresponding volumes of paired volumes (discussed in further detail with respect to FIG. 2). In addition, storage 130 may include components, as depicted and described in further detail with respect to FIG. 5, in accordance with embodiments of the present invention.

Configuration program 300 is a program for configuring a storage system to support data mirroring workloads received from a primary computing system. In one embodiment, configuration program 300 responds to identifying a new workload of a client that utilizes data mirroring by accessing one or more databases to identify one or more configurations to apply to the system 120. In another embodiment, configuration program 300 responds to an initiation of data mirroring for a workload (e.g., application) of system 101 by verifying that a configuration stored within system 120 is optimized. In some embodiments, a triggering event activates an instance of configuration program 300, such as a task of copy program 122, or a change identified within networked computing environment 100 by an aspect of monitoring functions 123. In various embodiments, configuration program 300 identifies a configuration associated with data mirroring that is not fully optimized but matches a determined set of information and dictates within a threshold. Configuration program 300 may execute an instance of optimization program 400 to modify the selected configuration for subsequent implementation.

In other embodiments, configuration program 300 initiates the execution of one or more instances of optimization program 400 to determine changes related to configurations associated with data mirroring by system 120 in response to identifying one or more changes associated with the activity of writing data generated by one or more workloads of system 101, changes identified with respect to network 140, and/or changes within system 101. In some embodiments, multiple instances of configuration program 300 execute concurrently within LPAR 127 to support data mirroring associated with different applications of a client that execute within the primary computing system.

Optimization program 400 is a program that determines one or more modifications to configuration associated with data mirroring by system 120 and/or parameters utilized by an instance of copy program 122 to improve or optimize data mirroring for one or more workloads generated within system 101. Optimization program 400 may utilize a combination of factors to determine one or more modifications associated with a set of configuration information utilized by system 120 for data mirroring. Modifications associated with a set of configuration information associated with data mirroring can include changes to one or more parameters utilized by copy program 122. For example, the combination of factors utilized by optimization program 400 may include changes to a set of hardware related to system 101, changes to a set of hardware related to system 120, analyses of data mirroring (e.g., historic, current, a combination thereof), parameters of copy program 122, requirements of a client, and/or the current configuration settings associated with LPAR 127 and/or system 120. Optimization program 400 can utilize simulated data writes to determine whether one or more modifications improve or optimize a configuration associated data mirroring related to the system 120.

In one embodiment, optimization program 400 determines changes to a configuration of a system 120 based on one or more snapshots of data mirroring activity. In another embodiment, optimization program 400 determines changes to a configuration associated with data mirroring based on analyses and/or models of previous instances (e.g., historical performance data) of data mirroring. In various embodiments, optimization program 400 utilizes I/O simulation program 125 to generate I/O activity for testing changes to a set of configuration information associated with data mirroring. In some embodiments, optimization program 400 determines changes to a configuration associated with data mirroring based monitoring changes to one or more factors, such as data mirroring activity, network traffic, and write pacing initiated within system 101. In one scenario, optimization program 400 executes in response to configuration program 300 determining that changes (i.e., modifications) are needed to optimize data mirroring by system 120. In another scenario, optimization program 400 executes in response to a dictate by an administrator of a system 120. Alternatively, a client that mirrors data to system 120 may dictate the execution of optimization program 400. In some scenarios, instances of optimization program 400 executes concurrently to determine changes to one or more sets of configuration information for utilization by a subsequent initiation of LPAR 127. In other scenarios, optimization program 400 executes offline when data mirroring is suspended or stops (e.g., an application of a client terminates). In an example, optimization program 400 can execute offline to identify changes within networked computing environment 100 that can affect data mirroring between system 101 and system 120.

In one embodiment, system 120 communicates through network 140 to system 101 and one or more instances of database 150. Network 140 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 140 can be any combination of connections and protocols that will support communications between system 101, system 120, and one or more instances of database 150, in accordance with embodiments of the present invention.

In some embodiments, network 140 utilizes high-speed, high-reliability communication connections, such as communication path 142 (short-dashed line) to process the communication protocols and data mirroring between system 101 and system 120, as well as communicating one or more sets of configuration information to or from database 150. In one embodiment, communication path 142 is representative of a plurality of network connections that connect system 101 to system 120 by respective instances of network interfaces 106 and 126. In another embodiment, network 140 includes communication path 141 (solid line) based on other communication protocols and connections (not shown) utilized by system 101, system 120, and/or database 150 for communicating less time-sensitive information and data than information and data processed by instances of communication path 142. For example, system 120 may utilize a file transfer protocol (FTP) to upload information to or download data from database 150. In various embodiments, network 140 operates locally via wired, wireless, or optical connections and can be any combination of connections and protocols (e.g., personal area network (PAN), near field communication (NFC), laser, infrared, ultrasonic, etc.).

Database 150 is representative of one or more shared databases that are utilized as a centralized storage location for sets of configuration information for a plurality of storage systems (e.g., instances of system 120). Information within database 150 is periodically updated with information from database 124 of an instance of system 120. In one embodiment, database 150 includes information associated with hardware within system 101 utilized by a client, information related to network 140 during the mirroring of data, a plurality of workloads, and I/O write activity corresponding to workload. In some embodiments, the information within database 150 is cross-referenced among clients, applications of clients, hardware utilized within a primary computing system, network information, sets of configuration information associated with a storage system, and I/O write activity. In various embodiments, I/O write activity is expressed or modeled with respect to one or more characteristics. In an example, I/O write activity may be expressed with respect to one or more time-based statistical values, such as mean, median, standard deviation, moving average, etc. In a further embodiment, database 150 includes information relating to the relationships and interactions among the stored information as identified by machine learning, such as network traffic reducing available bandwidth and therefore throttling data mirroring rates until additional communication resources are allocated.

Figure 2:
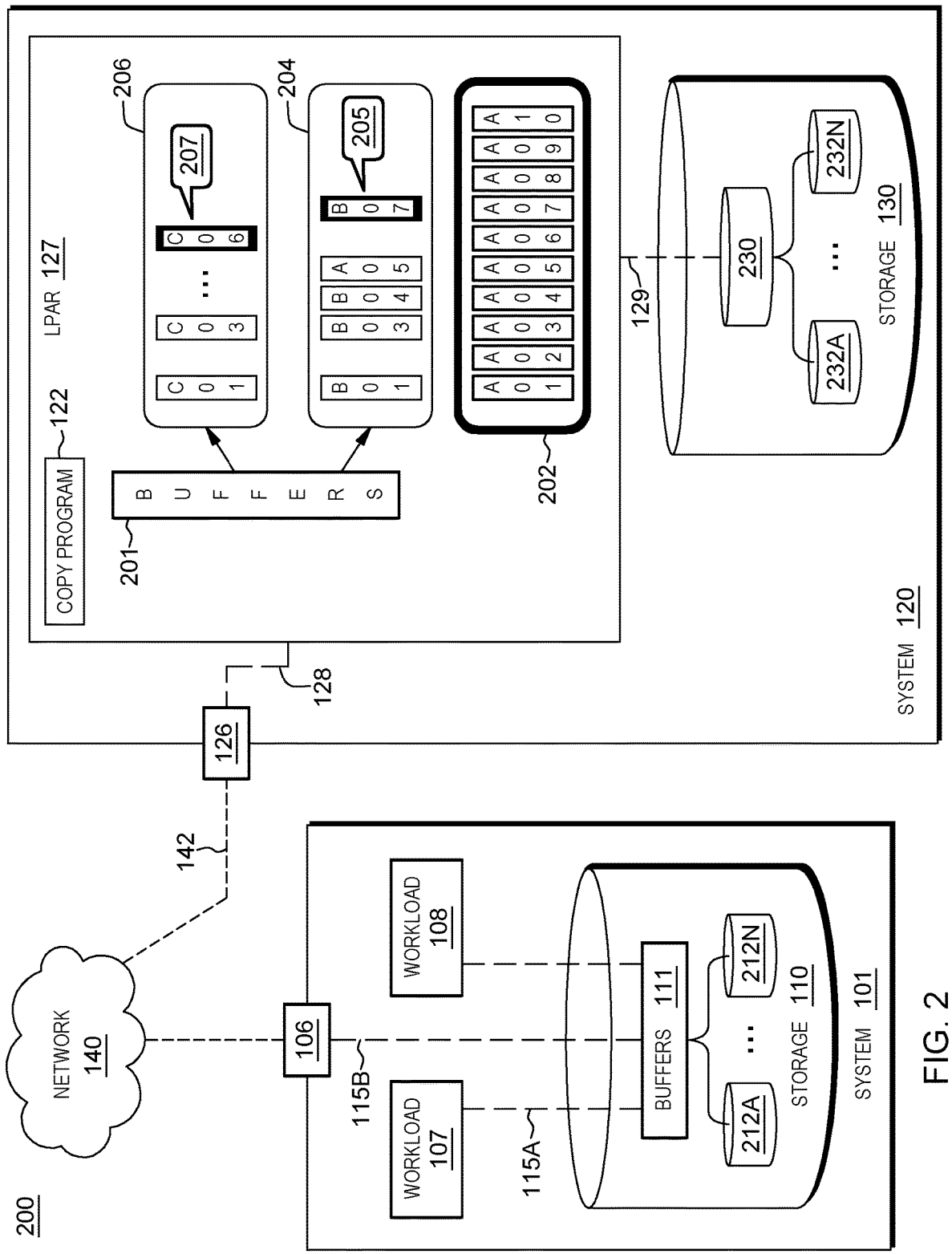
FIG. 2 illustrates additional details associated with mirroring data from a primary computing system to a storage system, in accordance with an embodiment of the present invention.

FIG. 2 is an illustrative example of various aspects of data mirroring between a primary computing system and a secondary storage system, in accordance with embodiments of the present invention. Within system 101 (e.g., the primary computing system), an application (not shown) generates one or more instances of workload 107 and workload 108. In an embodiment, storage 110 includes one or more DASD subsystems that include a SCSM (not shown), buffers 111 and a plurality of logical or physical volumes (e.g., client-side storage) for storing data represented by volumes 212A through 212N. Volumes 232A through 232N of storage 130 of system 120 are corresponding server-side (e.g., auxiliary storage, target storage) volumes of volume pairs utilized for mirroring data from system 101. Commands and/or definitions input to a SCSM identify the volumes that comprise volume pairs for data mirroring. In an example, a profile for a client of an application that generates data represented by workload 107 includes a list of volume pair identifications, such as volumes 212A and 232A form a volume pair, and volumes 212G and 232G form another volume pair. In various embodiments, volumes of storage 110 and corresponding volumes of a volume pair within storage 130 of system 120 have the same capacity and device geometry (e.g., track capacity and number of tracks per cylinder).

Buffers 111 receive write activity, such as a plurality of tracks (not shown) represented by workload 107 and workload 108, via one or more internal communication paths 115A (long-dashed line). In an embodiment, the plurality of tracks of data received to buffers 111 is organized into consistency groups (not shown), such as records A01-A10, B01-B07, and C01-C06. Instances of internal communication paths 115A and 115B can be physical data busses, portions of a virtual LAN (VLAN), etc. In various embodiments, tracks of data associated with workload 107 and workload 108 are stored and processed concurrently. In an embodiment, a SCSM writes a track of data within buffers 111 to one volume of volumes 212A through 212N. In some embodiments, in response to receiving a write acknowledgement from a volume within storage 110 that stores a track of data, a record corresponding to the track within buffer 111 updates to include a time stamp and the volume that stores the track.

In an embodiment, storage 110 utilizes another instance of an internal communication path, such as 115B (long-dashed line) to access network interface 106. In another embodiment, storage 110 receives commands originating from one or more tasks of an instance of copy program 122 executing within an LPAR (e.g., LPAR 127) of system 120, to perform data mirroring between system 101 and system 120. System 101 (e.g., network interface 126) communicates with system 120 via network interface 126 utilizing one or more instances of communication path 142 (e.g., communication channels) of network 140. In some embodiments, the number of instances of communication path 142 utilized to mirror data from system 101 to system 120 is based on a set of configuration information related to system 120 that is associated with mirroring data, such numbers of network channel subsystems, associated NICs, and communication ports.

LPAR 127 includes at least one instance of copy program 122. Copy program 122 generates various tasks (not shown) utilized to mirror data from system 101 for storage within system 120. Some tasks of copy program 122 utilize one or more instances of internal communication path 128 of system 120 to access network interface 126. In an embodiment, a set of configuration information associated with data mirroring defines the bandwidth of internal communication path 128 and the network channel subsystems, NICs, and communication ports, etc. represented by communication network interface 126 that communicates with system 101 over network 140. In some embodiments, a set of configuration information associated with data mirroring includes a set of parameters utilized by copy program 122 (e.g., number of reader tasks, a size related to a journal file, a number of journal volumes (e.g., intermediate storage volumes) for striping journal files, memory allocated to buffers 201, etc.). In an example, the communication bandwidth associated with data mirroring is affected by a number of reader tasks (not shown) that copy program 122 spawns within LPAR 127.

Data within buffers 111 is "pulled" (e.g., asynchronously copied) to system 120 based on receiving commands from one or more instances of a task (e.g., a reader task) spawned by an instance of copy program 122 executing within LPAR 127. In an embodiment, a task of copy program 122 periodically polls (e.g., issues channel commands to) the SCSM of storage 110 to identify updates within buffers 111, such as tracks that were written to various volumes since the prior data mirroring communication related to a reader task. In another embodiment, a task of copy program 122 periodically issues one or more commands directly to a storage 110 to identify tracks that were written to various volumes since the prior data mirroring communication. In one embodiment, tracks (e.g., records) of data within buffers 111 are grouped in record sets based on the timestamps between the current data poll and the previous data poll. In various embodiments, an information associated with a data mirroring protocol identifies the number of records included in a record set. In one example, the numbers of records in a record set is included in a response to a channel command. Records of a record set are received to LPAR 127 and stored within buffers 201. The size of memory allotted by copy program 122 from the provisioned memory of LPAR 127 to buffers 201 is based on a parameter within the set of parameters included in the set of configuration information associated with data mirroring.

Another task of copy program 122 identifies records stored within buffers 201 and groups records into consistency groups based at least on timestamps related to information associated with record sets. In an embodiment, based on receiving metadata associated with a data mirroring protocol, copy program 122 identifies the number of records that comprise each record set. In an example, consistency group 204 will include seven records (e.g., tracks) as indicated by callout 205 associated with element B07 (dark-bordered box). Similarly, consistency group 206 will include six tracks as indicated by callout 207 associated with element C06 (dark-bordered box). In the illustrative example, consistency group 204 is incomplete comprised of four of seven records: B01, B03, and B05. Similarly, consistency group 206 is incomplete comprised of two of six records: C01 and C03.

In response to determining that a full set of records for a consistency group is received to buffers 201, copy program 122 "hardens" the consistency group to form a journal file. In an example, copy program 122 determines that records A01 through A10 comprise a complete consistency group, and a task of copy program 122 creates journal file 202 (dark-bordered, rounded cornered box). Journal file 202 exists within the real storage of LPAR 127 as opposed to within buffers 201. The rate at which copy program 122 can identify records within buffer 201 and consolidate the identified records into consistency groups to form journals is based on rates of data received to LPAR 127 and the computing resources provisioned to LPAR 127. Examples of computing resource that affect copy program 122 are a number of central processing units (CPUs) provisioned, a speed of the CPUs, and whether I/O accelerators are provisioned to LPAR 127.

In some embodiments, in response to forming a consistency group, a task of copy program 122 acknowledges the I/O activity related to buffers 201 to system 101 via network interface 126. In other embodiments, in response to writing (i.e., migrating) journal file 202 to intermediate storage (i.e., journal volumes) 230, a task of copy program 122 acknowledges the I/O activity to system 101 (e.g., issues a channel command) via network interface 126. Network interface 126 communicates the acknowledgement from an instance of copy program 122 to the SCSM of storage 110 to release memory within buffers 111 corresponding the one or more record sets related to the acknowledgement.

In an embodiment, in response to copy program 122 creating a journal file, another task of copy program 122 writes the journal file 202 from real memory of LPAR 127 to one or more storage devices (not shown) of intermediate storage 230 via internal communication path 129. In one embodiment, copy program 122 includes metadata within a journal to indicate which volume (e.g., volser) of storage 130 stores each record of a journal. In various embodiments, each record (e.g., A01 thru A10) within journal file 202 retains the storage location information corresponding to a volume within storage 110. Journal file 202 is striped (e.g., distributed) among one or more journal volumes of intermediate storage 230. Data striping increases the speed at which one or more journal files are moved from LPAR 127 to storage 130. In some embodiments, the set of configuration information associated with data mirroring by LPAR 127 includes a parameter that dictates the number of stripes (i.e., journal volumes) an instance of copy program 122 utilizes to move a journal file from LPAR 127 to intermediate storage 230. In response to a successful write of journal file 202 to intermediate storage 230, a memory management task (not shown) can release the memory space within buffers 201 corresponding to a consistency group that formed journal file 202 and the real storage of LPAR 127 corresponding to journal file 202.

In another embodiment, in response to successfully striping journal file 202 among one or more volumes of intermediate storage 230, a SCSM (not shown) of storage 130 identifies the volume identifier (e.g., volser) corresponding to each record within journal file 202 and distributes the records comprising journal file 202 to the identified volumes within storage 130 that are paired to volumes within storage 110. In an example, if record A01 was written to volume 212C of storage 110 and volume 212C/232C are paired volumes, then the mirrored copy of record A01 is written to the corresponding volume within storage 130, volume 232C.

Figure 3:
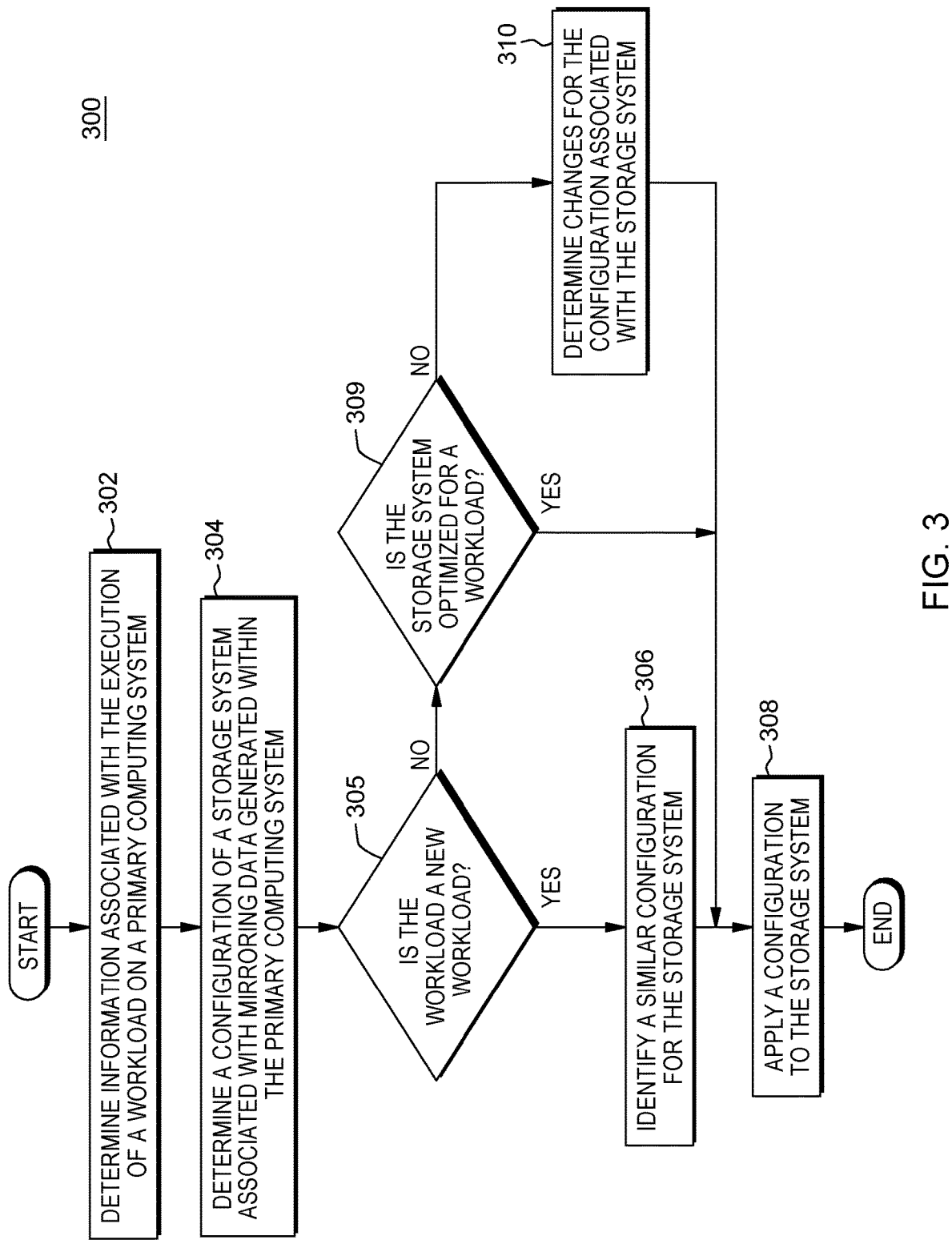
FIG. 3 depicts a flowchart of the operational steps of a storage system configuration program, in accordance with an embodiment of the present invention.

FIG. 3 is a flowchart depicting operational steps for configuration program 300, a program for configuring a storage system to support data mirroring for workloads generated by applications of a primary computing system, in accordance with embodiments of the present invention. In an embodiment, configuration program 300 executes in response to system 120 receiving a notification from system 101 indicating that an application that utilizes data mirroring initiates. In one embodiment, configuration program 300 is a task included in copy program 122. In another embodiment, configuration program 300 is a program of system 120 that executes to check each instance of data mirroring as a data mirroring task or LPAR starts. In some embodiments, one or more instances of configuration program 300 are copied to LPAR 127 and execute in the background in a paused state until called by an instance of copy program 122. Multiple instances of configuration program 300 can execute concurrently within system 120. In various embodiments, multiple instances of configuration program 300 concurrently execute within LPAR 127 to support data mirroring associated with different applications (not shown) of a client that executes within system 101.

In step 302, configuration program 300 determines information associated with the execution of a workload on a primary computing system. Information associated with the execution of a workload on the primary computing system (e.g., system 101) includes one or more executing applications and corresponding workloads generating data for mirroring to system 120, information related to the hardware of system 101 associated with storing write workloads (e.g., storage 110), and protocols for mirroring data to system 120. In an example, information related to the hardware of system 101 includes information associated with one or more DASD subsystems, information corresponding to networking subsystems, computing resources, I/O accelerators, etc. In one embodiment, in response to identifying an execution of an application (not shown) of system 101 that utilizes data mirroring, configuration program 300 queries database 104 for information associated with the execution of a workload on a system 101 that mirrors data to system 120. In another embodiment, in response to a restart of system 120 and/or LPAR 127 configuration program 300 queries database 104 for information associated with the execution of a workload on a system 101 that mirrors data to system 120.

In various embodiments, configuration program 300 obtains information related to network 140 and instances of communication path 142 utilized to transmit data and one or more communications between system 101 and system 120. In some embodiments, configuration program 300 queries one or more aspects of monitoring functions 103 to obtain information, such as a level of consumption of computing resources, or rates of data writing. In other embodiments, configuration program 300 utilizes a task of copy program 122 to obtain information associated with the execution of a workload on system 101, such as a hardware configuration of system 101 associated with the workload. In another embodiment, in response to configuration program 300 identifying that a new configuration for mirroring data is created for system 120, configuration program 300 obtains one or more estimated rates of I/O activity (e.g., data mirroring) from a client of system 101 or an administrator of system 120.

In step 304, configuration program 300 determines a configuration of a storage system associated with mirroring data generated within the primary computing system. Configuration information associated with data mirroring includes provisioning information for LPAR 127, information related to storage 130, parameters utilized by an instance of copy program 122, information related to networking between system 120 and system 101, etc. In one embodiment, system 120 receives a notification to mirror data generated by an application of system 101 and configuration program 300 determines a configuration associated with data mirroring based on a profile (e.g., of a client, of an application) within a database. In another embodiment, in response to a restart of system 120 and/or LPAR 127, configuration program 300 determines a configuration associated with data mirroring based on a profile within a database. In some embodiments, configuration program 300 queries database 124 for a configuration associated with data mirroring that corresponds an application/workload related to the notification received by system 120. In other embodiments, configuration program 300 queries database 150 for a configuration associated with data mirroring that corresponds an application/workload related to the notification received by system 120. In some embodiments, configuration program 300 obtains a set of configuration information associated with a notification associated with data mirroring from a client or administrator.

In decision step 305, configuration program 300 determines whether the workload is a new workload. In one embodiment, configuration program 300 determines that the workload is a new workload based on not identifying a configuration associated with data mirroring that corresponds a workload related to the notification received by system 120 in either database 124 or database 150. In another embodiment, configuration program 300 determines that the workload is a new workload based on input and/or dictates from a client of system 101 or an administrator of system 120.

Responsive to determining that the workload is a new workload (Yes branch, decision step 305), configuration program 300 identifies a similar configuration for the storage system (step 306).

In step 306, configuration program 300 identifies a similar configuration for the storage system. In one embodiment, configuration program 300 identifies a set of configuration information for system 120 based on querying one or more databases to compare the dictates for data mirroring of the new application/workload, information associated with system 101 generating the workload, information within one or more profiles of a client, and information related to the network 140 transmitting the mirrored data with the plurality of sets of configuration information and related information stored within the databases (e.g., database 124, database 150). Configuration program 300 may identify a similar configuration, within a threshold, based on one or more factors, such as data mirroring rates, information related to hardware of system 101 utilized by applications, provisioning information for LPARs of storage systems utilized for data mirroring, information related to DASD subsystems of the primary computing system and associated storage system, etc. In an example, an administrator of system 120 may define a degree of similarity as a weighted average of two or more factors. A threshold associated with determining a degree of similarity may be set an administrator of system 120. In another example, configuration program 300 may identify a similar configuration utilizing relationships identified by machine learning.

In another embodiment, configuration program 300 identifies two or more configurations associated with data mirroring based on a lesser degree of similarity (e.g., large threshold) between the dictates for data mirroring, information associated with system 101, and information related to the network 140. In one scenario, configuration program 300 selects a configuration. In another scenario, configuration program 300 presents an administrator of system 120 the selection of two or more configurations to choose among, and/or modify to support data mirroring for the new workload. Subsequently, configuration program 300 applies an identified configuration associated with data mirroring to the storage system (step 308).

Referring to decision step 305, responsive to determining that the workload is not a new workload (No branch, decision step 305), configuration program 300 determines whether the storage system is optimized for a workload (decision step 309).

In decision step 309, configuration program 300 determines whether the storage system is optimized for the workload. In one embodiment, configuration program 300 determines that a configuration associated with mirroring data for a workload is optimized based on information received from system 101, such as the instances of write pacing within system 101 is below a threshold level. In another embodiment, determines that a configuration associated with mirroring data for a workload is optimized based on performance data received from an instance of copy program 122 executing within LPAR 127. In one example, configuration program 300 determines that a configuration is optimized if copy program 122 does not pause copy activity in response to buildup of unread record sets within buffers 201, or if journal files are written to storage 130 within a window of time (e.g., performance of LPAR 127 does not degrade based on memory constraints). In another example, configuration program 300 determines that a determined set of configuration information is optimized based on analyzing historical performance monitoring information and the information determined in step 302.

In some embodiments, configuration program 300 utilizes multiple criteria to determine that a storage system is optimized for a workload. In another example, configuration program 300 determines that a configuration is optimized if (i) copy program 122 does not indicate impacts to mirroring tasks above a threshold level and (ii) that LPAR 127 is not over provisioned by more than a threshold amount. In various embodiments, configuration program 300 determines that a configuration associated with data monitoring is optimized based on utilizing a test-LPAR (not shown), one or more outputs of I/O simulation program 125, and analyzing the resultant performance information generated by the test-LPAR (discussed in further detail with respect to FIG. 4, step 404).

Responsive to determining that the storage system is not optimized for a workload (No branch, decision step 309), configuration program 300 determines changes for the configuration associated with the storage system (step 310).

In step 310, configuration program 300 determines changes for the configuration associated with the storage system. In some embodiments, configuration program 300 delays executing step 310 until a period of performance monitoring occurs. After the performance monitoring period, configuration program 300 queries database 124 and/or database 150 to identify one or more other sets of configuration information associated data mirroring based, at least in part, on the performance data, information associated with a current a set of information related to system 101, and/or information associated with network 140. In other embodiments, configuration program 300 executes an instance of optimization program 400 to determine changes for the configuration associated with data mirroring for system 101 related to the workload. Configuration program 300 may provide optimization program 400 information obtained at steps 302, 304, and/or decision step 309. Subsequently, configuration program 300 applies a changed configuration associated with data mirroring to the storage system (step 308).

Referring to decision step 309, responsive to determining that the storage system is optimized for a workload (Yes branch, decision step 309), configuration program 300 applies a configuration to the storage system (step 308).

In step 308, configuration program 300 applies a configuration to the storage system. Applying a configuration (e.g., a set of configuration information) to the system 120 can include provisioning LPAR 127, starting one or more instances of copy program 122, configuring network interface 126, and interfacing with storage 130. In one embodiment, configuration program 300 applies a configuration associated with data mirroring to the system 120 for a new workload based on identifying a similar configuration associated with data mirroring within either database 124 or database 150. In another embodiment, configuration program 300 applies a configuration associated with data mirroring to the system 120 for a new workload utilizing the configuration associated with data mirroring, selected by an administrator of system 120, from among the configurations associated with data mirroring identified within one or more databases.

In some embodiments, if the determined configuration associated with data mirroring for the workload is optimized, then configuration program 300 applies the determined configuration associated with data mirroring to system 120. In other embodiments, configuration program 300 applies a configuration associated with data mirroring to system 120 that includes one or more changes determined by optimization program 400. In various embodiments, configuration program 300 delays applying a configuration associated with data mirroring to system 120. In some scenarios, configuration program 300 delays applying the configuration associated with data mirroring until an application and the one or more related workloads of the application terminates. A subsequent instance of configuration program 300 applies the updated configuration at the restart of the data mirroring for the application. In other scenarios, configuration program 300 delays applying the updated configuration associated with data mirroring until the rate of data mirroring drops below a threshold value to minimize the effects of applying the updated configuration for data mirroring to system 120.

Figure 4:
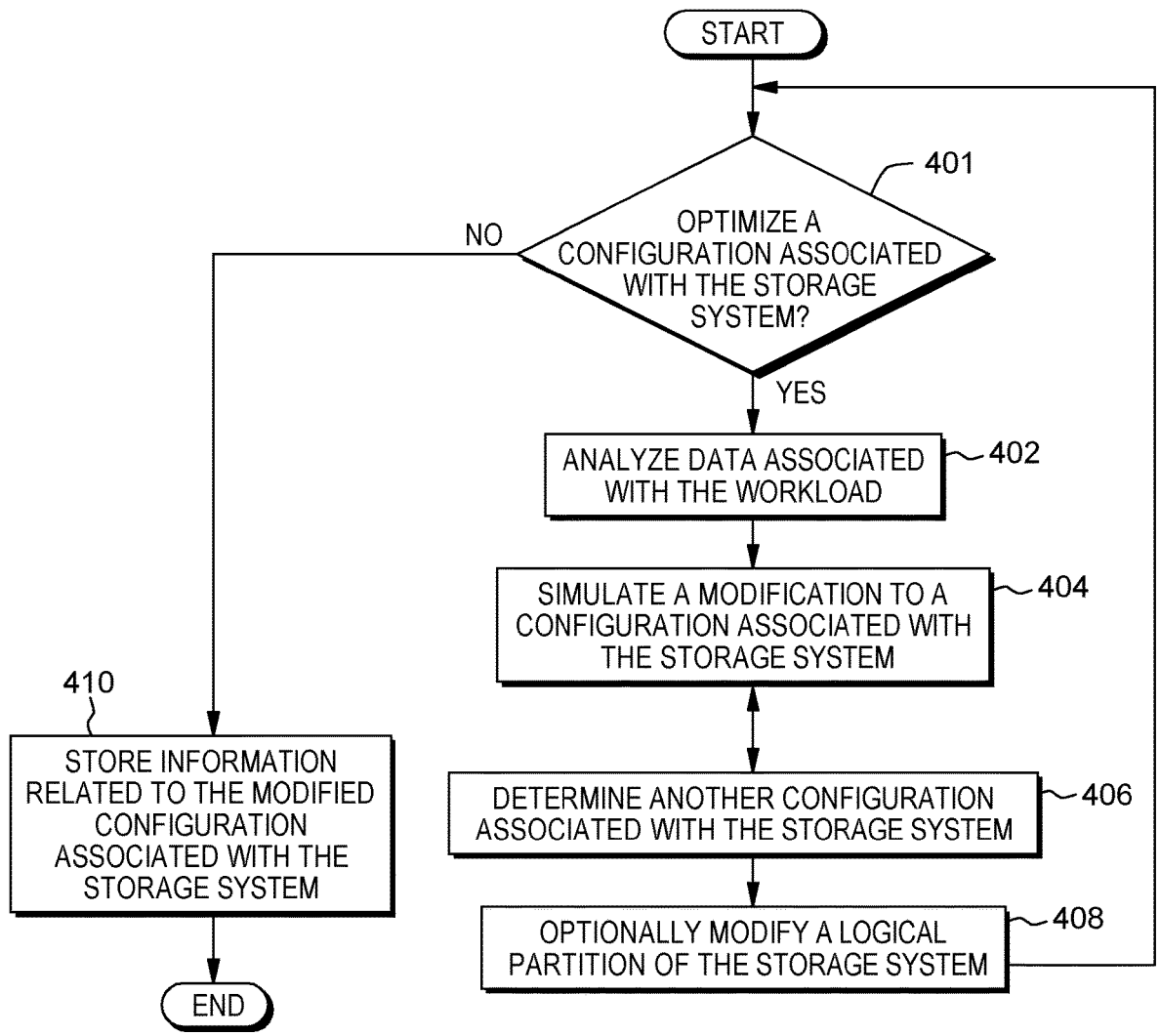
FIG. 4 depicts a flowchart of the operational steps of a configuration optimization program, in accordance with an embodiment of the present invention.

FIG. 4 is a flowchart depicting operational steps for optimization program 400, a program for determining one or more modifications to aspects of a storage system and/or parameters utilized by mirror copy program within the storage system to improve or optimize data mirroring for one or more workloads generated within a primary computing system, in accordance with embodiments of the present invention. Multiple instances of optimization program 400 can execute concurrently within system 120. In some embodiments, multiple instances of optimization program 400 execute to support LPAR 127 mirroring data associated with different workloads of a client within the system 101. In other embodiments, one or more instances of optimization program 400 executes offline to determine one or more modified configurations associated with system 120 for use with subsequent executions of a plurality of applications or workload (not shown) that utilize system 120 for data mirroring.

In decision step 401, optimization program 400 determines whether to optimize a configuration associated with the storage system. In one embodiment, optimization program 400 determines to optimize a configuration associated with data mirroring for system 120 based on information received from configuration program 300 at step 310. In another embodiment, an instance of optimization program 400 executes while a workload, such as workload 107 and/or workload 108 of system 101 mirrors data to system 120. Optimization program 400 loops via the Yes branch of decision step 401 and pauses at step 402 to periodically analyze data associated with the workload, such as once a day. If optimization program 400 determines that the current configuration associated with the storage system is not currently optimized (previously discussed with respect to FIG. 3, decision step 309), then optimization program 400 resumes and determines another configuration associated with the storage system.

In some embodiments, optimization program 400 executes offline (e.g., data mirroring has terminated) to optimize a configuration associated with the storage system based on a dictate. Dictates for optimization program 400 to execute and analyze data associated with a workload and a set of related storage system configuration information associated with data mirroring can be initiated by an administrator of system 120, by a system monitoring function, and/or in response to an analysis of information included in database 150. In another embodiment, optimization program 400 executes offline and determines to optimize a configuration associated with data mirroring based on one or more factors, such as analyzing performance data and/or analyzing SMF messages associated with instances of data mirroring.

Responsive to determining to optimize a configuration associated with a storage system (Yes branch, decision step 401), optimization program 400 analyzes data associated with the workload (step 402).

In step 402, optimization program 400 analyzes data associated with the workload. The data associated with a workload can include quantities and rates of data mirroring based on historic data stored within a database (e.g., database 104 and/or database 124), data mirroring for a currently executing application (not shown) and one or more related workloads, or a combination thereof. Data associated with a workload may also include SMF messages associated with system 101, SMF messages associated with system 120, performance data obtained by an instance of copy program 122, and/or performance data related to LPAR 127. Performance data obtained by an instance of copy program 122 may include information related to system 101 and/or system 120. In some embodiments, optimization program 400 analyzes data associated with a workload utilizing one or more statistical methods known in the art, such as median, standard deviation, moving average, etc.

In another embodiment, optimization program 400 identifies one or more time-based patterns related to the data mirroring of a workload. In one scenario, optimization program 400 may identify a time-based pattern that affects one or more aspects of a configuration and that can be modeled with respect to one or more feedback/control variables (e.g., proportional, integral, and derivative terms). In another scenario, optimization program 400 may identify a time-based pattern that affects one or more aspects of a configuration associated with data mirroring and is modeled with respect to one or more mathematical models, such a polynomial model, a rational function, a regression analysis, etc. In various embodiments, optimization program 400 stores the results of the analyses of data within one or more databases.

Still referring to step 402 in a further embodiment, optimization program 400 utilizes machine learning to identify one or more patterns relate to multiple variables that affect data mirroring of a workload, and to generate one or more models related to data mirroring and associated configuration information. Variable may include time/date associated with an application generating the workload; loading of the system 120; loading of system 101, and/or quantities of data traffic within network 140. Optimization program 400 may analyze historical data associated with a plurality of instances of a data mirroring to identify one or more patterns, such as intra-workload patterns, instance-to-instance related patterns, and/or patterns related to infrastructure (e.g., network delays, network bandwidth) constraints.

In step 404, optimization program 400 simulates a modification to a configuration associated with the storage system. Optimization program 400 may store the results (e.g., responses) of various of I/O simulations and related sets of configurations information within one or more databases, such as database 124. In one embodiment, optimization program 400 executes I/O simulation program 125 within a separate LPAR (not shown) to recreate or mimic data mirroring activity based on one or more models of real-world data. In an example, optimization program 400 provisions to one or more test-LPARs (not shown) within system 120 to receive simulated data mirroring activity generated by I/O simulation program 125. At least one test-LPAR may reproduce the provisioning of LPAR 127 and a corresponding set of parameters utilized by an instance of copy program 122. In some instances, optimization program 400 executes I/O simulation program 125 to test changes to one or more parameters related to creating journal files and migrating journal files from LPAR 127 to storage 130. In other instances, optimization program 400 executes I/O simulation program 125 to test changes to one or more parameters related to receiving data to LPAR 127, such as a number of reader tasks and associated aliases. In another embodiment, I/O simulation program 125 modifies the output of an I/O simulation model to include other factors that can affect data mirroring, such as changes within network 140 and/or changes that affect the network interfaces (e.g., network interface 106, network interface 126).

In some embodiments, optimization program 400 utilizes the one or more test-LPARs (not shown) within system 120 to verify one or more responses to changes to a set configuration information associated with data mirroring. Optimization program 400 may quantify or rank the responses, positive or negative, in response to changes to a set configuration information associated with data mirroring. In one scenario, changes to a set of configuration information associated with data mirroring may be related to a list, matrix, or array of defined by an administrator of system 120. In one example, optimization program 400 utilizes one or more I/O simulations and a defined array of parameters utilized by copy program 122, such as BufferSizes=20000 and 25000; Journals=10, 12, 14, and 16; and Striping=4, 6, and 8 volumes to test for changes in performance based on each combination of parameters. Subsequent, executions of optimization program 400 can reference the stored responses as opposed to recreating the simulations and set of configuration information. In another scenario, optimization program 400 simulates a change to one or more other determined configurations associated with the storage system obtained in step 406. In some scenarios, optimization program 400 simulates a modification to a configuration associated with data mirroring based on one or more constrains or hardware changes, such as provisioning limitations of LPAR 127, bandwidth changes related to network 140, and/or hardware changes related to system 101.

In step 406, optimization program 400 determines another configuration associated with the storage system. In one embodiment, optimization program 400 queries database 124 and/or database 150 to obtain one or more other sets of configuration information associated with data mirroring based identifying other sets of configuration information that support data mirroring activity similar to one or more I/O simulations. In some embodiments, optimization program 400 determines another set of configuration information based on one or more constraints, such as provisioning limitations of LPAR 127, a threshold/degree of similarity, and/or one or more analyses of responses stored in a database. In an alternative embodiment, optimization program 400 queries an administrator of system 120 for one or more modifications to the set of configuration information associated with data mirroring to test. In various embodiments, steps 404 and 406 of optimization program 400 interact to determine or change a set of configuration information associated with data mirroring as opposed to looping via decision step 401.

In step 408, optimization program 400 optionally modifies a logical partition of the storage system. In one embodiment, (i) if LPAR 127 of system 120 is configured for dynamic provisioning and (ii) if the one or more changes in computing resources related to the set of configuration information (step 406) are within the constraints of the dynamic provisioning parameters, (iii) then optimization program 400 loops to decision step 401 without modifying the provisioning of LPAR 127. In another embodiment, (i) if multiple instances of copy program 122 are executing within LPAR 127, and (ii) if optimization program 400 determines that there are under-utilized computing resources provisioned to LPAR 127, then optimization program 400 reallocates resources among the instances of copy program 122 executing within LPAR 127 as opposed to modifying LPAR 127.

In some embodiments, optimization program 400 determines that LPAR 127 has insufficient resources to implement a determined configuration change. If optimization program 400 determines that the data mirroring activity is associated with a critical application, then optimization program 400 identifies a configuration within the provisioning constraints of LPAR 127 and does not modify the active instance of LPAR 127 of the storage system. However, optimization program 400 flags the updated provisioning requirements as part of a configuration modification for a subsequent instance of provisioning and initiation of LPAR 127.

In an alternative embodiment, optimization program 400 modifies a test-LPAR (not shown), within system 120, with the determined set of configuration information and inputs one or more sets of data writing activity generated by I/O simulation 125 to verify whether the changes to the test-LPAR improve or optimize a configuration associated with data mirroring. If optimization program 400 determines that the changes to the provisioning of the test-LPAR improve or optimize a configuration associated with data mirroring, the optimization program 400 flags to changes to the LPAR and various other parameters for saving. Subsequently, optimization program 400 loops to decision step 401 to determine whether to optimize a configuration associated with the storage system.

Referring to decision step 401, responsive to determining not to optimize a configuration associated with the storage system (No branch, decision step 401), optimization program 400 stores information related to the modified configuration associated with the storage system (step 410). In an example, if a previously modified configuration associated with data mirroring optimizes the storage system, then optimization program 400 stores (via the No branch of decision 401) the information related to the modified configuration associated with the storage system in step 410.

In step 410, optimization program 400 stores information related to the modified configuration associated with the storage system. Information related to the modified configuration associated with the storage system includes, but is not limited to, a set of information related to hardware associated with system 101; information related to network 140, such as a bandwidth associated with instances of communication path 142; a set of parameters utilized by copy program 122 (e.g., number of reader tasks, journal size, number of DASD volumes for journal striping, memory allocated to buffers 201, etc.); results of one or more simulations; current and proposed provisioning information for LPAR 127; and/or an analysis of the quantities and rates of data mirroring for each workload stored on the storage system.

In one embodiment, optimization program 400 stores information related to the modified configuration associated with the system 120 within database 124 of system 120 for subsequent use. In one example, optimization program 400 stores information related to the modified configuration associated with system 120 to database 124 for provisioning a new instance of LPAR 127. In another example, optimization program 400 stores information related to the modified (e.g., optimized) configuration associated with system 120 to database 124 for use with subsequent executions of an application (not shown) that generates data corresponding to workload 108 and the data is mirrored to system 120. In various embodiments, optimization program 400 utilizes network 140 to upload a copy of the modified configuration to database 150 for sharing among instances of system 120 and/or other storage system utilized for data mirroring. In some embodiments, after storing modified configuration data to at least database 124, optimization program 400 also communicates the modified set of configuration information to the instance of configuration program 300 that initiated optimization program 400. In other embodiments, after storing modified configuration data to at least database 124, optimization program 400 terminates.

Figure 5:
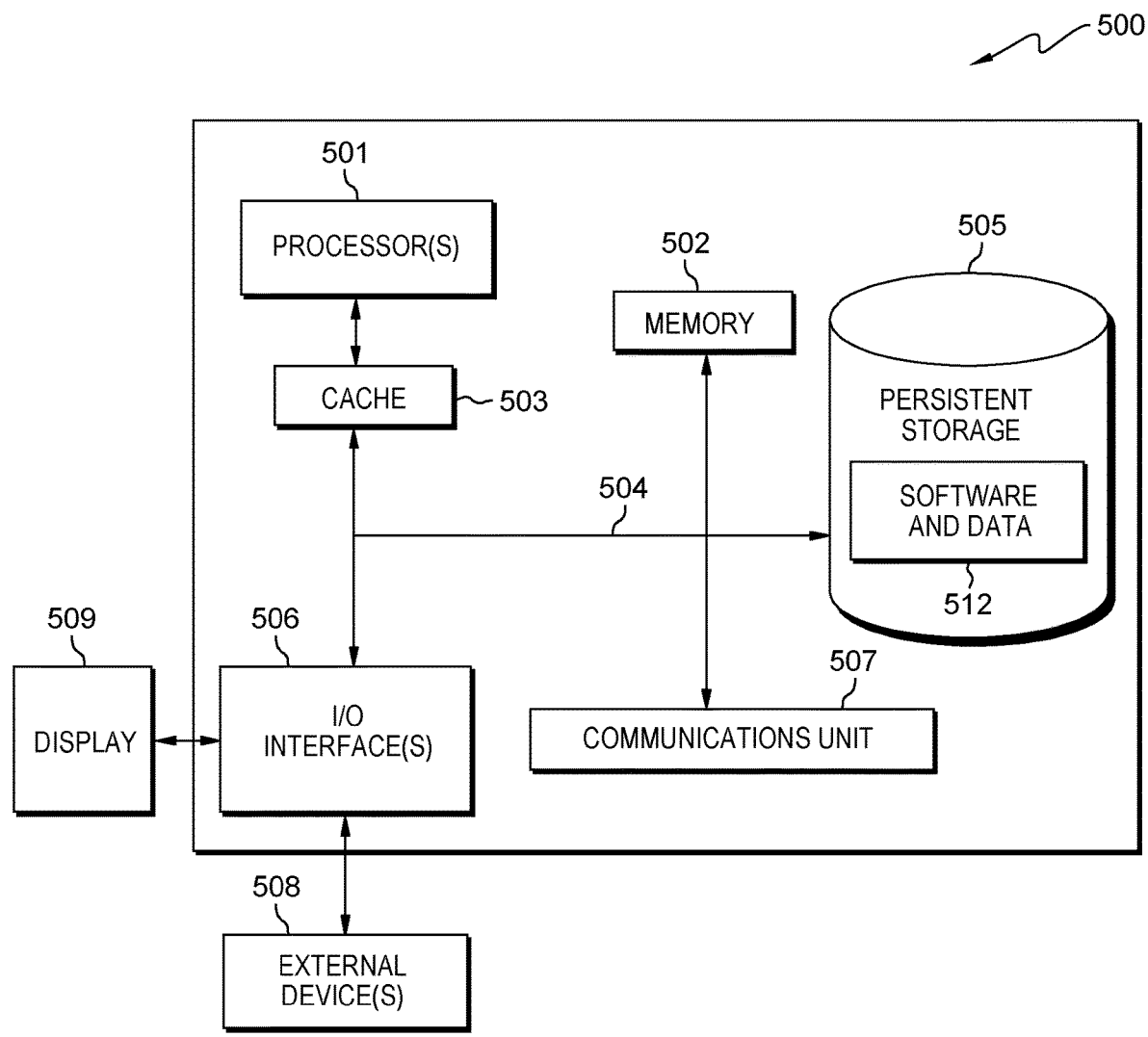
FIG. 5 is a block diagram of components of a computer, in accordance with an embodiment of the present invention.

FIG. 5 depicts a block diagram of computer system 500, which is representative of system 101, system 120, and database 150. Computer system 500 is an example of a system that includes software and data 512. Computer system 500 includes processor(s) 501, memory 502, cache 503, persistent storage 505, communications unit 507, input/output (I/O) interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch. In some embodiments, internal communication paths 115, 128, and 129 are representative of a portion of communication fabric 504.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502. In an embodiment, with respect to storage 110, buffers 111 are based on a portion of memory 502 associated with caching data for a storage subsystem.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information. In one embodiment, with respect to system 101, storage 110 is included in persistent storage 505. In another embodiment, with respect to system 120, storage 130 is included in persistent storage 505.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to system 101, software and data 512 includes: system functions 102, monitoring functions 103, database 104, and various programs and data (not shown). With respect to system 120, software and data 512 includes system functions 121, copy program 122, monitoring functions 123, database 124, I/O simulation program 125, configuration program 300, optimization program 400, and various programs and data (not shown). With respect to storage 110 and/or storage 130 software and data 512 includes embedded firmware and microcode (not shown).

Communications unit 507, in these examples, provides for communications with other data processing systems or devices, including resources of system 101, system 120, and database 150. In these examples, communications unit 507 includes one or more network interface cards or communication systems such as network interface 106 and network interface 126. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a client or administrator and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for configuring a storage system, the method comprising:
   receiving, by one or more computer processors, at a storage system, an indication to initiate data mirroring for an application;
   determining, by the one or more computer processors, a set of information associated with a network-accessible computing system that hosts the application;
   identifying, by the one or more computer processors, an analysis of historic performance data associated with data mirroring to the storage system with respect to the application;
   identifying, by the one or more computer processors, a set of configuration information associated with data mirroring from among a plurality of sets of configuration information associated with data mirroring based, at least in part, on the determined set of information associated with the network-accessible computing system and the identified analysis of historic performance data associated with data mirroring with respect to the application; and
   applying, by the one or more computer processors, the identified set of configuration information associated with data mirroring for the application to the storage system.

2. The method of claim 1, wherein the set of information associated with the network-accessible computing system that mirrors data to the storage system includes information selected from a group consisting of information related to one or more storage subsystems of the network-accessible computing system that store data that is mirrored, information related to one or more networking subsystems of the network-accessible computing system, and information associated with a network that transmits data for mirroring from the network-accessible computing system to the storage system.

3. The method of claim 1, wherein applying the identified set of configuration information associated with data mirroring for the application to the storage system further comprises:
   provisioning, by the one or more computer processors, a logical partition within the storage system based on provisioning information within the identified set of configuration information associated with data mirroring.

4. The method of claim 3, further comprising:
   identifying, by the one or more computer processors, a set of parameters, utilized by a data mirroring program, within the identified set of configuration information;
   copying, by the one or more computer processors, an instance of the data mirroring program to the logical partition; and
   executing, by the one or more computer processors, within the logical partition, the copied instance of the data mirroring program utilizing the identified set of parameters for data mirroring within the identified set of configuration information.

5. The method of claim 4, wherein the set of parameters utilized by the data mirroring program includes parameters selected from a group consisting of a value for a size of memory utilized for buffering data received for mirroring, a value for a number of journal files, a value corresponding to a size for the journal files, and a value for a number of intermediate storage volumes utilized to stripe the journal files from the logical partition to a storage subsystem within the storage system.

6. The method of claim 1, wherein applying the identified set of configuration information associated with data mirroring for the application to the storage system further comprises:
   configuring, by the one or more computer processors, one or more network connections of the storage system for data mirroring with the network-accessible computing system based on information within the identified set of configuration information associated with data mirroring;
   identifying, by the one or more computer processors, within the identified set of configuration information, a value for a number of reader tasks utilized by a data mirroring program; and
   assigning, by the one or more computer processors, the identified number of reader tasks to the one or more network connections of the storage system for data mirroring.

7. The method of claim 1, wherein identifying the set of configuration information associated with data mirroring from among the plurality of sets of configuration information associated with data mirroring further comprises:
- determining, by the one or more computer processors, a degree of similarity between the determined set of information associated with the network-accessible computing system, the identified analysis of historic performance data associated with data mirroring with respect to the application, and the plurality of sets of configuration information associated with data mirroring;
- identifying, by the one or more computer processors, a set of provisioning resources available to create a logical partition within the storage system for mirroring data associated with the application; and
- selecting, by the one or more computer processors, a set of configuration information from among a plurality of sets of configuration information associated with data mirroring based on the set of provisioning resources available to create the logical partition within the storage system associated with the application and the determined degree of similarity associated with sets of configuration information and corresponding provisioning resources utilized by each determined set of configuration information associated with data mirroring.

8. A computer program product for configuring a storage system, the computer program product comprising:
- one or more computer readable storage media and program instructions stored on the one or more computer readable storage media, the program instructions readable/executable by one or more computer processors and further comprising:
  - program instructions to receive, at a storage system, an indication to initiate data mirroring for an application;
  - program instructions to determine a set of information associated with a network-accessible computing system that hosts the application;
  - program instructions to identify an analysis of historic performance data associated with data mirroring to the storage system with respect to the application;
  - program instructions to identify a set of configuration information associated with data mirroring from among a plurality of sets of configuration information associated with data mirroring based, at least in part, on the determined set of information associated with the network-accessible computing system and the identified analysis of historic performance data associated with data mirroring with respect to the application; and
  - program instructions to apply the of identified set configuration information associated with data mirroring for the application to the storage system.

9. The computer program product of claim 8, wherein the set of information associated with the network-accessible computing system that mirrors data to the storage system includes information selected from a group consisting of information related to one or more storage subsystems of the network-accessible computing system that store data that is mirrored, information related to one or more networking subsystems of the network-accessible computing system, and information associated with a network that transmits data for mirroring from the network-accessible computing system to the storage system.

10. The computer program product of claim 8, wherein the program instructions to apply the identified set of configuration information associated with data mirroring for the application to the storage system further comprise:
- program instructions to provision a logical partition within the storage system based on provisioning information within the identified set of configuration information associated with data mirroring.

11. The computer program product of claim 10, further comprising:
- program instructions to identify a set of parameters, utilized by a data mirroring program, within the identified set of configuration information;
- program instructions to copy an instance of the data mirroring program to the logical partition; and
- program instructions to execute, within the logical partition, the copied instance of the data mirroring program utilizing the identified set of parameters for data mirroring within the identified set of configuration information.

12. The computer program product of claim 11, wherein the set of parameters utilized by the data mirroring program includes parameters selected from a group consisting of a value for a size of memory utilized for buffering data received for mirroring, a value for a number of journal files, a value corresponding to a size for the journal files, and a value for a number of intermediate storage volumes utilized to stripe the journal files from the logical partition to a storage subsystem within the storage system.

13. The computer program product of claim 8, wherein the program instructions to apply the identified set of configuration information associated with data mirroring for the application to the storage system further comprise:
- program instructions to configure one or more network connections of the storage system for data mirroring with the network-accessible computing system based on information within the identified set of configuration information associated with data mirroring;
- program instructions to identify within the identified set of configuration information, a value for a number of reader tasks utilized by a data mirroring program; and
- program instructions to assign the identified number of reader tasks to the one or more network connections of the storage system for data mirroring.

14. The computer program product of claim 8, wherein the program instructions to identify the set configuration information associated with data mirroring from among a plurality of sets of configuration information associated with data mirroring further comprise:
- program instructions to determine a degree of similarity between the determined set of information associated with the network-accessible computing system, the identified analysis of historic performance data associated with data mirroring with respect to the application, and the plurality of sets of configuration information associated with data mirroring;
- program instructions to identify a set of provisioning resources available to create a logical partition within the storage system for mirroring data associated with the application; and
- program instructions to select a set of configuration information from among a plurality of sets of configuration information associated with data mirroring associated with data mirroring based on the set of provisioning resources available to create the logical partition within the storage system associated with the application and the determined degree of similarity associated with sets of configuration information and corresponding provisioning resources utilized by each determined set of configuration information associated with data mirroring.

15. A computer system for configuring a storage system, the computer system comprising:
one or more computer processors;
one or more computer readable storage media;
program instructions stored on the one or more computer readable storage media for reading/execution by at least one of the one or more computer processors, the program instructions further comprising:
program instructions to receive, at a storage system, an indication to initiate data mirroring for an application;
program instructions to determine a set of information associated with a network-accessible computing system that hosts the application;
program instructions to identify an analysis of historic performance data associated with data mirroring to the storage system with respect to the application;
program instructions to identify a set of configuration information associated with data mirroring from among a plurality of sets of configuration information associated with data mirroring based, at least in part, on the determined set of information associated with the network-accessible computing system and the identified analysis of historic performance data associated with data mirroring with respect to the application; and
program instructions to apply the identified set of configuration information associated with data mirroring for the application to the storage system.

16. The computer system of claim 15, wherein the set of information associated with the network-accessible computing system that mirrors data to the storage system includes information selected from a group consisting of information related to one or more storage subsystems of the network-accessible computing system that store data that is mirrored, information related to one or more networking subsystems of the network-accessible computing system, and information associated with a network that transmits data for mirroring from the network-accessible computing system to the storage system.

17. The computer system of claim 15, wherein the program instructions to apply the identified set of configuration information associated with data minoring for the application to the storage system further comprise:
program instructions to provision a logical partition within the storage system based on provisioning information within the identified set of configuration information associated with data mirroring.

18. The computer system of claim 17, further comprising:
program instructions to identify a set of parameters, utilized by a data mirroring program, within the identified set of configuration information;
program instructions to copy an instance of the data mirroring program to the logical partition; and
program instructions to execute, within the logical partition, the copied instance of the data mirroring program utilizing the identified set of parameters for data mirroring within the identified set of configuration information.

19. The computer system of claim 18, wherein the set of parameters utilized by the data minoring program includes parameters selected from a group consisting of a value for a size of memory utilized for buffering data received for mirroring, a value for a number of journal files, a value corresponding to a size for the journal files, and a value for a number of intermediate storage volumes utilized to stripe the journal files from the logical partition to a storage subsystem within the storage system.

20. The computer system of claim 15, wherein the program instructions to apply the identified set of configuration information associated with data mirroring for the application to the storage system further comprise:
program instructions to configure one or more network connections of the storage system for data mirroring with the network-accessible computing system based on information within the identified set of configuration information associated with data mirroring;
program instructions to identify within the identified set of configuration information, a value for a number of reader tasks utilized by a data mirroring program; and
program instructions to assign the identified number of reader tasks to the one or more network connections of the storage system for data mirroring.

* * * * *